United States Patent
Beall et al.

(10) Patent No.: US 11,815,368 B2
(45) Date of Patent: Nov. 14, 2023

(54) DUAL-MOUNT FOR SPRING-LOADED GEAR-DRIVEN RESOLVERS

(71) Applicant: Bell Textron Inc., Fort Worth, TX (US)

(72) Inventors: Grant Michael Beall, Arlington, TX (US); William Anthony Amante, Grapevine, TX (US); Jessica Arlie Revere, Haltom City, TX (US)

(73) Assignee: Textron Innovations Inc., Providence, RI (US)

( * ) Notice: Subject to any disclaimer, the term of this patent is extended or adjusted under 35 U.S.C. 154(b) by 886 days.

(21) Appl. No.: 16/846,372

(22) Filed: Apr. 12, 2020

(65) Prior Publication Data

US 2021/0318143 A1    Oct. 14, 2021

(51) Int. Cl.
| | |
|---|---|
| *G01D 5/22* | (2006.01) |
| *F16H 57/12* | (2006.01) |
| *F16H 19/00* | (2006.01) |
| *B64C 29/00* | (2006.01) |
| *B64C 11/00* | (2006.01) |
| *B64D 45/00* | (2006.01) |

(52) U.S. Cl.
CPC .......... *G01D 5/2291* (2013.01); *B64C 11/001* (2013.01); *B64C 29/0033* (2013.01); *B64D 45/0005* (2013.01); *F16H 19/001* (2013.01); *F16H 57/12* (2013.01); *F16H 2057/127* (2013.01)

(58) Field of Classification Search
CPC .. G01D 5/2291; G01D 11/30; B64C 29/0033; B64D 45/0005
See application file for complete search history.

(56) References Cited

U.S. PATENT DOCUMENTS

| | | | |
|---|---|---|---|
| 5,058,853 A | 10/1991 | Beloncik et al. | |
| 5,637,968 A * | 6/1997 | Kainec | B25B 23/14 318/432 |
| 8,680,849 B2 | 3/2014 | Himmelmann | |
| 2003/0121329 A1* | 7/2003 | Fore | G01P 15/18 73/514.01 |
| 2004/0129827 A1* | 7/2004 | Perlo | B64C 39/026 244/7 B |

\* cited by examiner

*Primary Examiner* — Muhammad S Islam
(74) *Attorney, Agent, or Firm* — Lightfoot & Alford PLLC

(57) ABSTRACT

A resolver assembly for a ducted-rotor aircraft is configured to detect and measure rotation of a spindle of the aircraft. The resolver assembly includes first and second gear-driven resolvers. The first and second resolvers are coupled about a shared pivot axis and are independently pivotable about the pivot axis to maintain engagement of the first and second resolvers with the spindle of the aircraft. The resolver assembly is configured such that the first and second resolvers are biased toward the spindle. The input shafts of the first and second resolvers are spaced from the pivot axis through respective first and second distances that extend outward from the pivot axis along respective first and second radial directions. The first distance is equal to the second distance and the first radial direction is not coincident with the second radial direction.

20 Claims, 9 Drawing Sheets

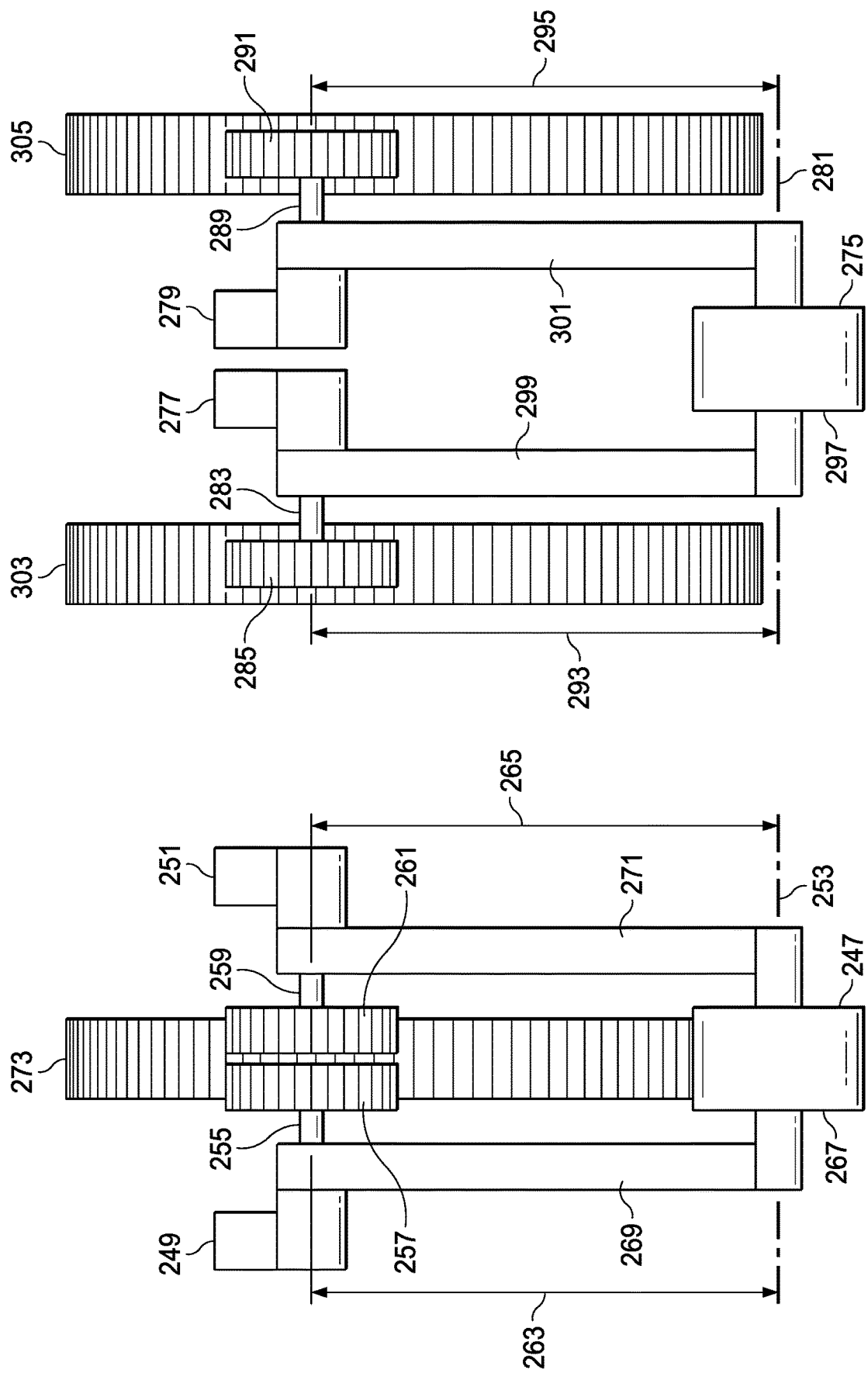

DUAL-MOUNT FOR SPRING-LOADED GEAR-DRIVEN RESOLVERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Ducted-rotor aircraft have at least one ducted rotor for providing lift and propulsion forces. A ducted rotor for such an aircraft typically has internal structure that supports a motor of the aircraft, and an aerodynamic exterior skin. One or more ducted rotors may be rotatably coupled to a fuselage of such an aircraft.

BRIEF DESCRIPTION OF THE DRAWINGS

FIG. 9 is a front view of another alternative embodiment of a resolver assembly according to this disclosure that may be implemented with the aircraft depicted in FIG. 1.

FIG. 10 is a front view of still another alternative embodiment of a resolver assembly according to this disclosure that may be implemented with the aircraft depicted in FIG. 1.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

A resolver assembly that is configured to detect and measure rotation of a spindle about a spindle axis is disclosed herein for use in ducted-rotor aircraft. It is desirable to minimize the number of separate components that make up a ducted-rotor aircraft, not only to limit the weight of the aircraft, but further to limit complexity and cost of the aircraft.

Figure 1:
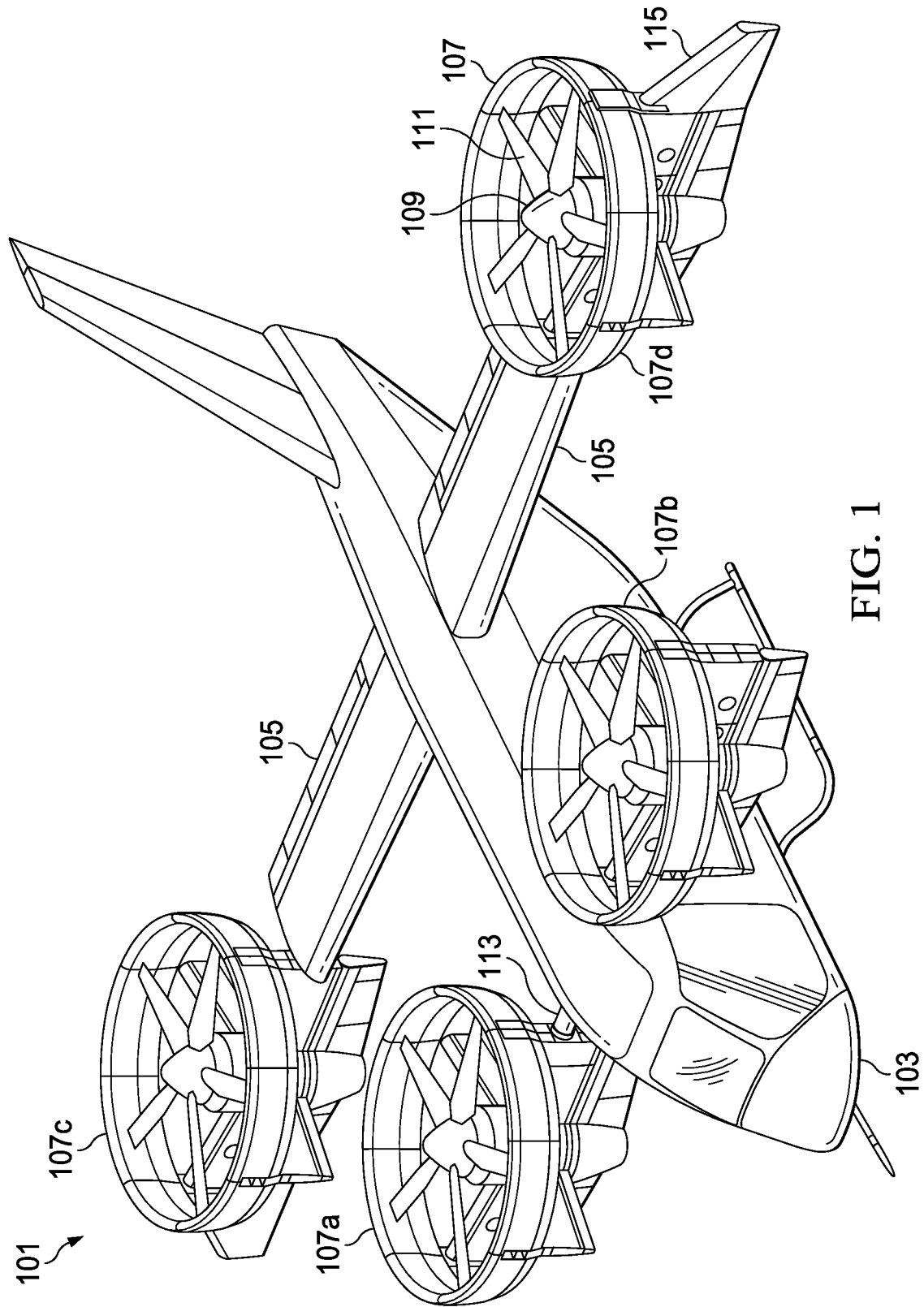
FIG. 1 is an oblique view of an aircraft with ducted rotors, the ducted rotors positioned for the aircraft to operate in a helicopter mode.
Figure 2:
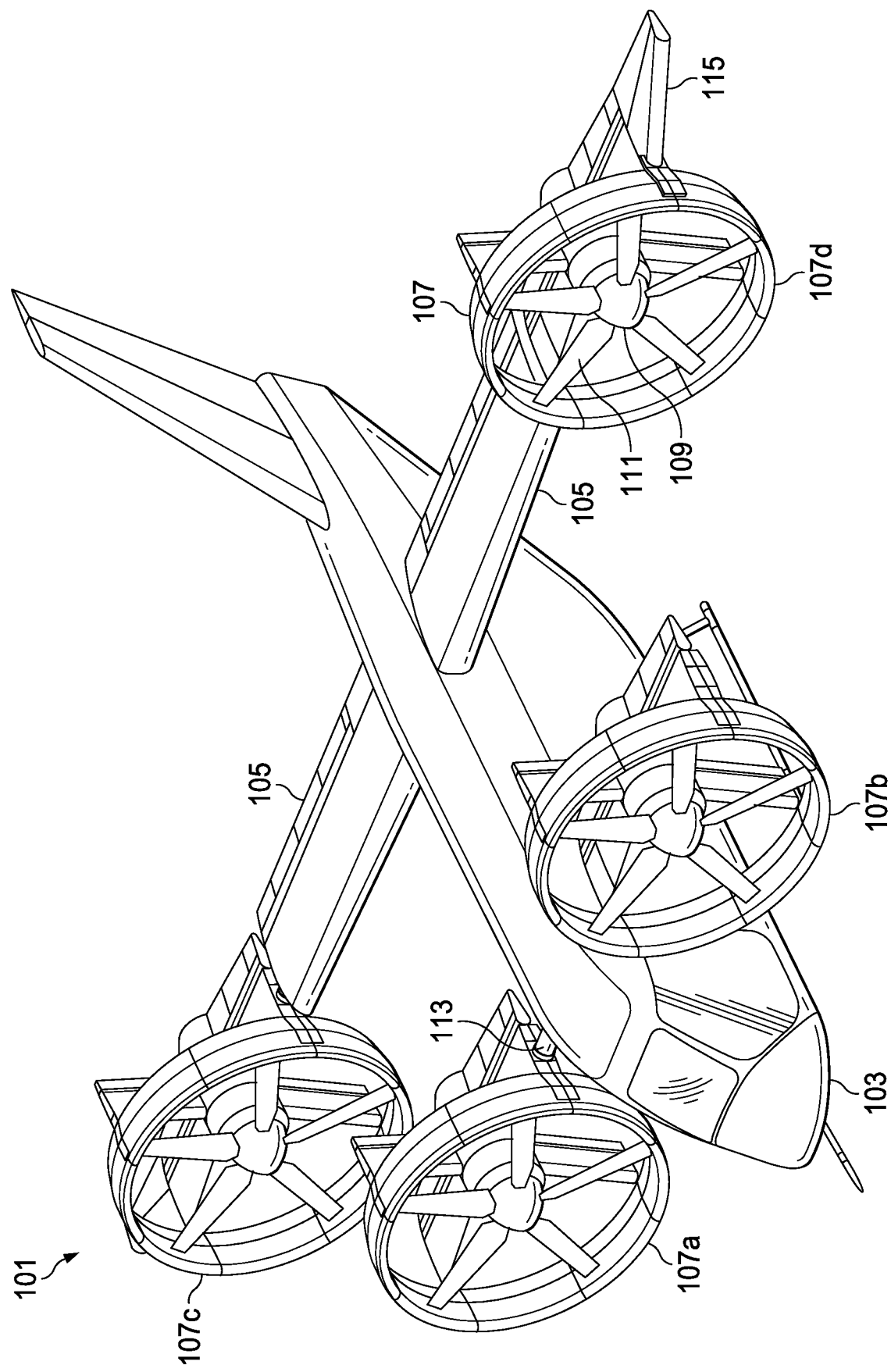
FIG. 2 is an oblique view of the aircraft depicted in FIG. 1, the ducted rotors positioned for the aircraft to operate in an airplane mode.

FIGS. 1 and 2 are oblique views of a ducted-rotor aircraft 101. Aircraft 101 comprises a fuselage 103 with a fixed wing 105 that extends therefrom and a plurality of pivotable ducts 107. Each duct 107 houses a power plant for driving an attached rotor 109 in rotation. Each rotor 109 has a plurality of blades 111 configured to rotate within a corresponding duct 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight.

In this embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. Ducts 107a and 107b are coupled directly to fuselage 103 by a first spindle 113. Ducts 107c and 107d are each rotatably coupled to a corresponding end of wing 105 via respective discrete spindles (not shown). As shown, ducts 107c and 107d each include a winglet 115 that is coupled thereto. It should be appreciated that aircraft 101 is not limited to the illustrated configuration having four ducts 107, and that aircraft 101 may alternatively be implemented with more or fewer ducts 107.

Figure 3:
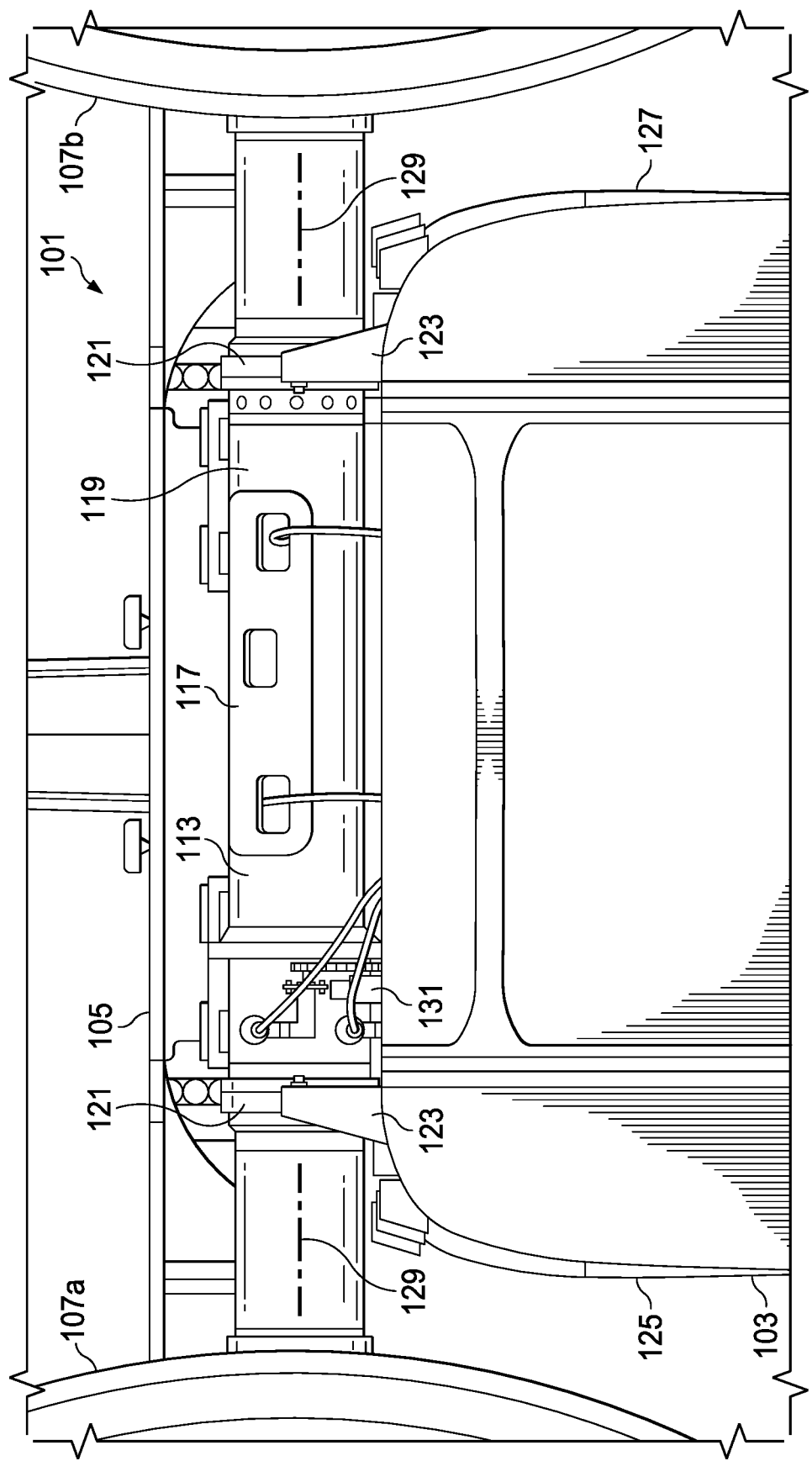
FIG. 3 is a front view of a portion of the aircraft depicted in FIG. 1, with a portion of exterior skin removed to illustrate a spindle that is rotatably coupled to the aircraft.

FIG. 3 is a front view of a portion of aircraft 101, with a portion of an aerodynamic exterior skin of fuselage 103 removed to illustrate a duct assembly 117 that is configured to rotatably couple ducts 107a and 107b to fuselage 103. As shown, duct assembly 117 includes duct 107a, duct 107b, and spindle 113. Spindle 113 is configured to support ducts 107a and 107b. As shown, ducts 107a and 107b are fixedly coupled to opposed ends of spindle 113 for rotation therewith. Duct 107a may be referred to as a first duct 107 of duct assembly 117 and duct 107b may be referred to as a second duct 107 of duct assembly 117.

Spindle 113 includes a shaft 119 that extends from a first end (not shown) that is disposed in duct 107a to a second end (now shown) that is disposed in duct 107b. As shown, shaft 119 of spindle 113 is cylindrical. It should be appreciated however, that shaft 119 is not limited to the illustrated cylindrical cross-section, and that shaft 119 may be alternatively implemented with any other suitable geometry. Shaft 119 may be fabricated from aluminum or any other suitable material.

Spindle 113 further includes two bearings 121 that are mounted on shaft 119. Bearings 121 are configured to rotatably couple spindle 113 to fuselage 103 of aircraft 101. In this embodiment, fuselage 103 includes a pair of cradles 123 that are configured to receive bearings 121 therein. As shown, a first cradle 123 is located on top of fuselage 103 near a first side 125 thereof and a second cradle 123 is located on top of fuselage 103 near an opposed second side 127 thereof. A first one of bearings 121 is configured to react to radial loads, and a second one of bearings 121 is configured to react to both radial and axial loads.

In this embodiment, spindle 113 is configured to be coupled to a linear actuator (not shown) that is mounted to fuselage 103. When operated, the linear actuator causes spindle 113 to rotate about a longitudinal spindle axis 129, for example during conversion of aircraft 101 between airplane mode and helicopter mode. In this regard, the linear actuator may be referred to as a conversion actuator. When the linear actuator causes spindle 113 to rotate, ducts 107a and 107b exhibit equal rotational displacement relative to each other about spindle axis 129.

Figure 4:
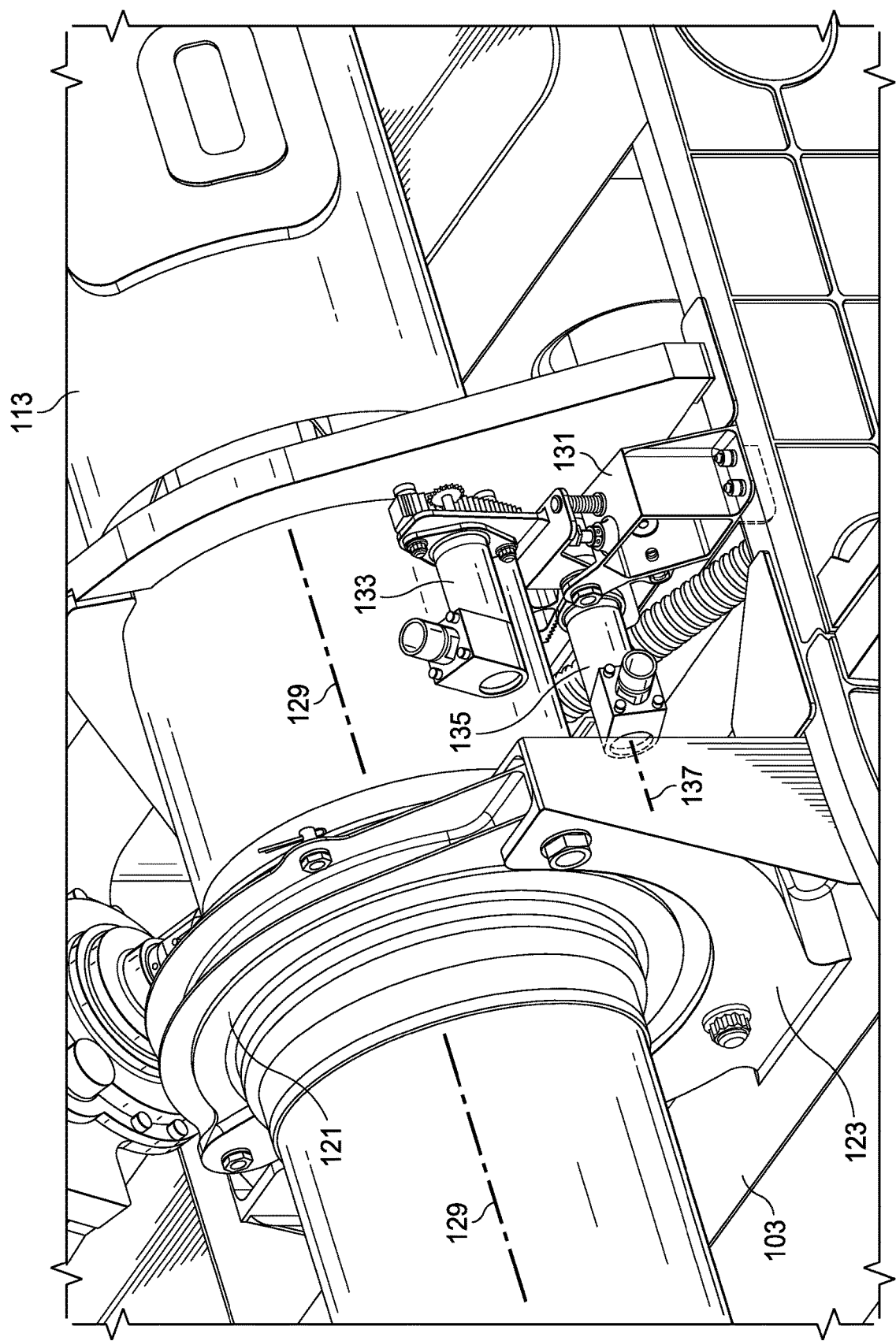
FIG. 4 is an oblique view of a portion of the aircraft depicted in FIG. 3, illustrating a resolver assembly according to this disclosure that detects and measures rotation of the spindle of the aircraft.

Aircraft 101 further includes a resolver assembly 131 that is configured to detect and measure rotation of spindle 113 about spindle axis 129. FIG. 4 is an oblique view of a portion of aircraft 101, depicting resolver assembly 131 in an installed position. In this embodiment, resolver assembly 131 comprises a first resolver 133 and a second resolver 135 that are configured to redundantly detect and measure rotation of spindle 113 about spindle axis 129. Preferably, first resolver 133 and second resolver 135 are gear-driven rotary variable differential transformer (RVDT) sensors. It should be appreciated that resolver assembly 131 is not limited to being implemented with RVDT sensors for first and second resolvers 133, 135, and that resolver assembly 131 may alternatively be implemented with one or more other types of resolvers.

In this embodiment, resolver assembly 131 is implemented as a dual-mount resolver assembly with gear-driven resolvers. More specifically, two resolvers are incorporated into a single mounting structure. Resolver assembly 131 is configured such that first resolver 133 and second resolver 135 are independently pivotable about a shared pivot axis 137. Pivot axis 137 extends parallel to spindle axis 129. This configuration enables resolver assembly 131 to maintain engagement of first resolver 133 and second resolver 135 with spindle 113. In this embodiment, resolver assembly 131 is configured to be mounted to a structural member of fuselage 103 of aircraft 101, for example as shown in FIG. 4.

Figure 5:
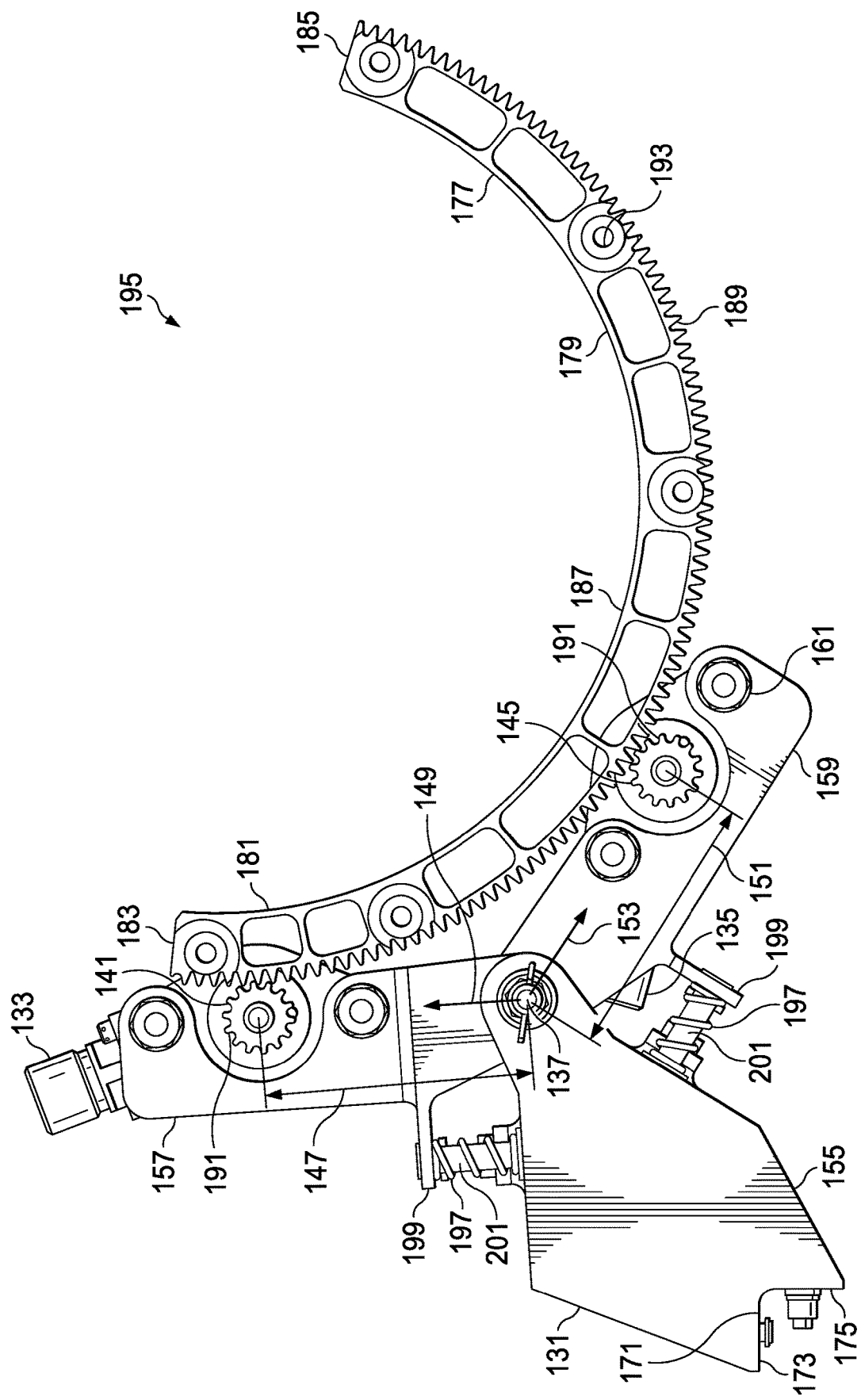
FIG. 5 is a right side view of the resolver assembly depicted in FIG. 4, the resolver assembly shown along with an engagement component.
Figure 6:
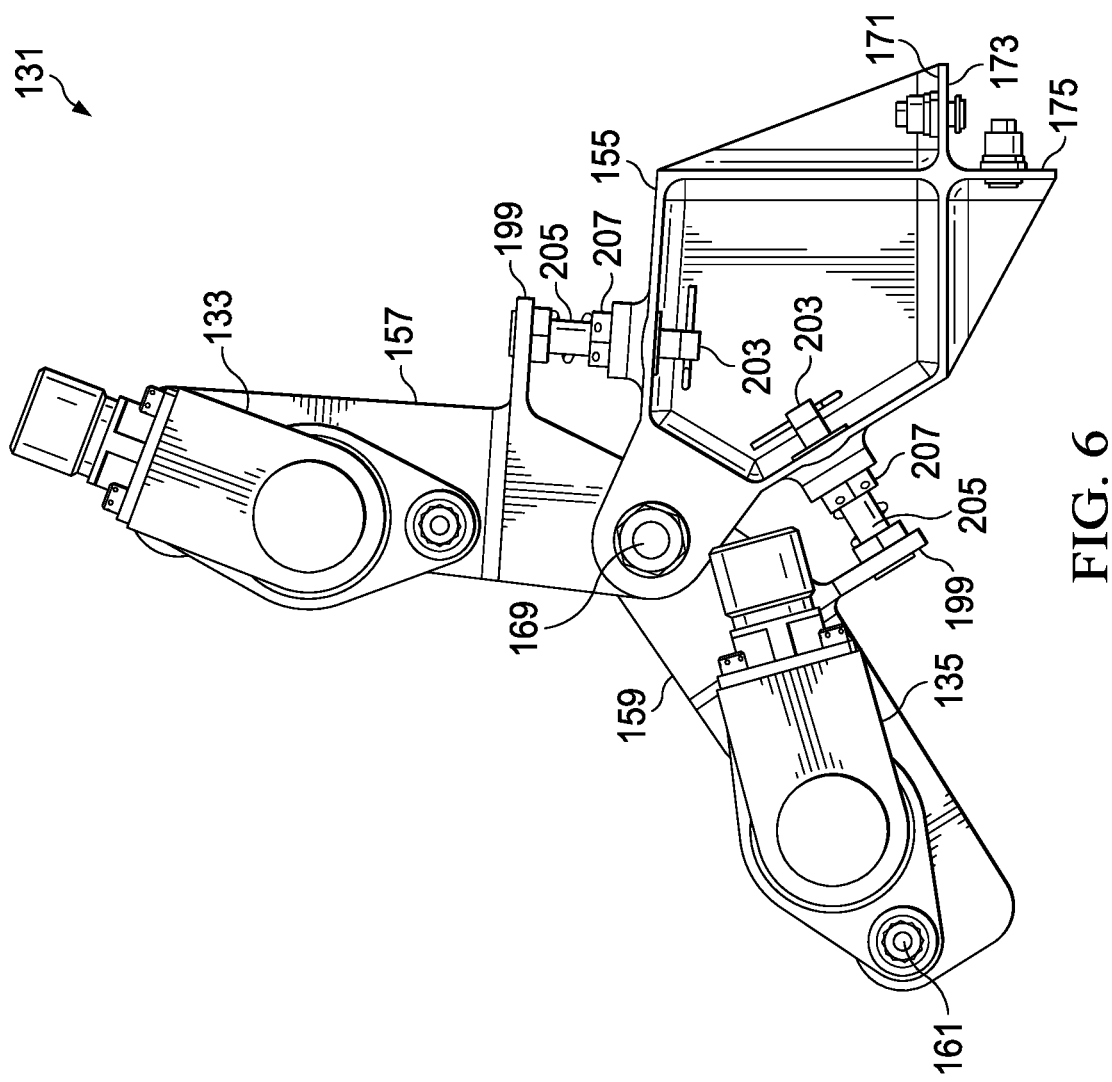
FIG. 6 is a left side view of the resolver assembly depicted in FIG. 4.
Figure 7:
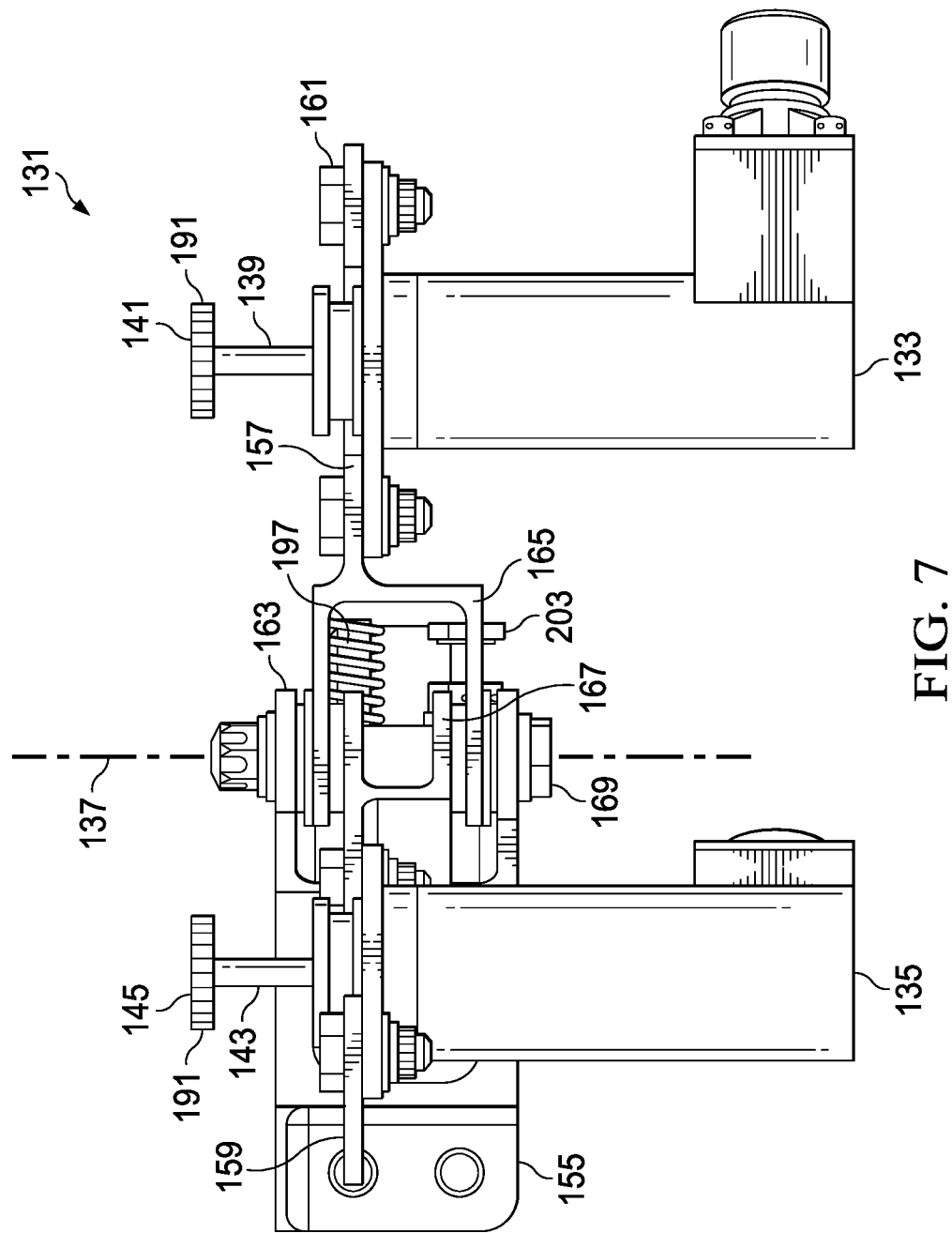
FIG. 7 is a rear view of the resolver assembly depicted in FIG. 4.

FIGS. 5 and 6 are right side and left side views, respectively, of resolver assembly 131. FIG. 7 is a rear view of resolver assembly 131. First resolver 133 comprises an input shaft 139 having a gear 141 that is coupled thereto and second resolver 135 comprises an input shaft 143 having a gear 145 that is coupled thereto. In this embodiment, input shaft 139 of first resolver 133 is spaced from pivot axis 137 through a first distance 147 along a first radial direction 149 that extends perpendicularly outward from a center of pivot axis 137 toward a central axis of input shaft 139. Input shaft 143 of second resolver 135 is spaced from pivot axis 137 through a second distance 151 along a second radial direction 153 that extends perpendicularly outward from pivot axis 137 toward a central axis of input shaft 143. In this embodiment, first distance 147 is equal to second distance 151, such that input shaft 139 of first resolver 133 and input shaft 143 of second resolver 135 are spaced equally from pivot axis 137 relative to each other. Furthermore, first radial direction 149 is not coincident with second radial direction 153. Stated differently, first radial direction 149 and second radial direction 153 are angularly offset about pivot axis 137 relative to each other.

In this embodiment, resolver assembly 131 further comprises a base 155, a first carrier 157 to which first resolver 133 is fixedly mounted, and a second carrier 159 to which second resolver 135 is fixedly mounted. As shown, first resolver 133 and second resolver 135 are secured to first carrier 157 and second carrier 159, respectively, via bolts 161. It should be appreciated that one or both of first resolver 133 and second resolver 135 may be alternatively secured to respective carriers, for example using another type of fastener.

First carrier 157 and second carrier 159 are coupled to base 155 such that first carrier 157 and second carrier 159 are independently pivotable relative to each other about pivot axis 137. In this embodiment, base 155 defines a clevis 163, first carrier 157 defines a clevis 165, and second carrier 159 defines a clevis 167. Clevis 167 of second carrier 159 is configured to be received within clevis 165 of first carrier 157, and clevis 165 of first carrier 157 is configured to be received within clevis 163 of base 155. Each of clevis 163, 165, and 167 define respective apertures (not shown) that extend therethrough, the apertures configured to receive a clevis pin 169 that couples together base 155, first carrier 157, and second carrier 159 and defines pivot axis 137. It should be appreciated that base 155, first carrier 157, and second carrier 159 are not limited to the respective illustrated configurations. For example, one or more of base 155, first carrier 157, and second carrier 159 may be alternatively configured to otherwise interconnect with one another about a shared pivot axis. Furthermore, one or both of first carrier 157 and second carrier 159 may be alternatively configured to allow the mounting of resolvers having configurations that differ from those shown.

Base 155 is configured to be mounted to a structural member of fuselage 103 of aircraft 101. In this embodiment, base 155 defines a mounting bracket 171 that is configured to be secured to a structural member of fuselage 103 using fasteners, such as bolts. Mounting bracket 171 defines a first surface 173 and a second surface 175 that are each configured to abut a corresponding surface of the structural member of fuselage 103 when resolver assembly 131 is in a mounted position relative to the structural member.

Aircraft 101 further includes an engagement component 177 that is configured to engage with first resolver 133 and second resolver 135 during rotation of spindle 113, thereby enabling first resolver 133 and second resolver 135 to detect and measure rotation of spindle 113 about spindle axis 129. In this embodiment, engagement component 177 comprises a body 179 in the form of an arc-shaped rib 181 that is configured to be mounted in a fixed position to spindle 113. Body 179 extends from a first end 183 to a second end 185 and defines a curved inner surface 187 that conforms to a corresponding portion of an outer surface of spindle 113. Body 179 further defines a plurality of gear teeth 189 that extend along an outer circumference of rib 181. Stated differently, body 179 has an arc-shaped outer surface that defines plurality of gear teeth 189. Gear 141 of first resolver 133 and gear 145 of second resolver 135 each define a respective plurality of gear teeth 191 that are complementary to and configured to engage (e.g., mesh) with plurality of gear teeth 189 of rib 181.

In operation, for example during conversion of aircraft 101 between helicopter mode and airplane mode, as spindle 113 pivots about spindle axis 129, respective gear teeth 189 of rib 181 mesh with gear teeth 191 of gear 141 of first resolver 133 and gear 145 of second resolver 135, thereby causing input shaft 139 of first resolver 133 and input shaft 143 of second resolver 135 to rotate in tandem with spindle 113. First and second resolvers 133, 135 translate the rotation of input shafts 139, 143, respectively, into respective measurements of angular displacement of spindle 113 that are reported to one or more systems of aircraft 101. Gear teeth 189 of engagement component 177 have a width that is wider than that of gears 141 and 145, such that engagement between gears 141 and 145 may be maintained if one or both of gears 141 and 145 and/or engagement component 177 move relative to each other along a longitudinal direction that extends parallel to spindle axis 129, for example during rotation of spindle 113.

In this embodiment, engagement component 177 is configured to be mounted to spindle 113 in a fixed position using fasteners, such as bolts. More specifically, body 179 defines a plurality of apertures 193 that extend therethrough, each aperture 193 configured to receive a fastener. In this regard, engagement component 177 is carried by spindle 113. Engagement component 177 and resolver assembly 131 may be implemented as a resolver system 195. It should be appreciated that engagement component 177 is not limited to the illustrated geometry of rib 181, and that engagement component 177 may alternatively be configured with any other suitable geometry. Moreover, it should further be appreciated that spindle 113 may be alternatively configured with an integral engagement component, for example a plurality of gear teeth that are integral with spindle 113 and that extend along a portion of an outer surface of spindle 113. In this regard, the plurality of gear teeth are carried by spindle 113.

Resolver assembly 131 is configured such that first resolver 133 and second resolver 135 are biased toward spindle 113, and in particular against engagement component 177. Biasing first resolver 133 and second resolver 135 toward spindle 113 isolates vibration and maintains engagement of first and second resolvers 133, 135 with engagement component 177. In this embodiment, resolver assembly 131 includes a pair of springs 197 that bias first and second resolvers 133, 135 against spindle 113. Each of first carrier 157 and second carrier 159 defines a tab 199 that extends rearward therefrom, each tab 199 having a post 201 coupled thereto that carries a corresponding one of the springs 197. First carrier 157 and second carrier 159 are each biased toward spindle 113 by a respective one of the springs 197. In this regard, resolver assembly 131 may be referred to as a spring-loaded resolver assembly.

In operation, for example during conversion of aircraft 101 between helicopter mode and airplane mode, if all or a portion of spindle 113 moves such that spindle axis 129 is displaced from its natural alignment, respective forces may be applied to one or both of first resolver 133 and second resolver 135 by engagement component 177. In response to the application of such forces, one or both of first carrier 157 and second carrier 159 may pivot about pivot axis 137. When spindle 113 subsequently returns to its natural position, thereby returning spindle axis 129 to its natural alignment, one or both of first carrier 157 and second carrier 159 may be biased toward engagement component 177, thereby maintaining engagement between first and second resolvers 133, 135 and engagement component 177.

In this embodiment, resolver assembly 131 further includes a pair of backstops 203. Each backstop 203 limits how far a corresponding one of first carrier 157 and second carrier 159 can pivot about pivot axis 137. Each backstop 203 is configured to, once a corresponding one of first carrier 157 or second carrier 159 has pivoted through a predetermined maximum pivot angle, prevent further pivoting of corresponding first carrier 157 or second carrier 159. Each backstop 203 comprises a shaft 205 that is coupled to a corresponding tab 199 of first carrier 157 or second carrier 159. Each shaft 205 is received in a corresponding portion of base 155 such that shaft 205 is translatable along a linear direction in and out of base 155. When one of first carrier 157 or second carrier 159 pivots about pivot axis 137 such that shaft 205 of a corresponding backstop 203 travels through a predetermined maximum linear travel distance that equates to the maximum pivot angle, respective portions of backstop 203 abut each other, such that further pivoting of first carrier 157 or second carrier 159 is prevented.

The predetermined maximum linear travel distance of shaft 205 of each backstop 203 may be fixed. Alternatively, backstops 203 may be implemented as adjustable backstops. In this embodiment, the maximum linear travel distance of shaft 205 of each backstop 203 may be set via rotation of a respective adjustment nut 207. Setting respective predetermined maximum pivot angles may prevent one or both of first carrier 157 and second carrier 159 from pivoting far enough that respective gear teeth 191 of one or both of gear 141 and gear 145 become disengaged from gear teeth 189 of engagement component 177, such that one or both of gear 141 and gear 145 skip one or more gear teeth 189 prior to reengaging with engagement component 177 when biased toward spindle 113 by springs 197.

Figure 8:
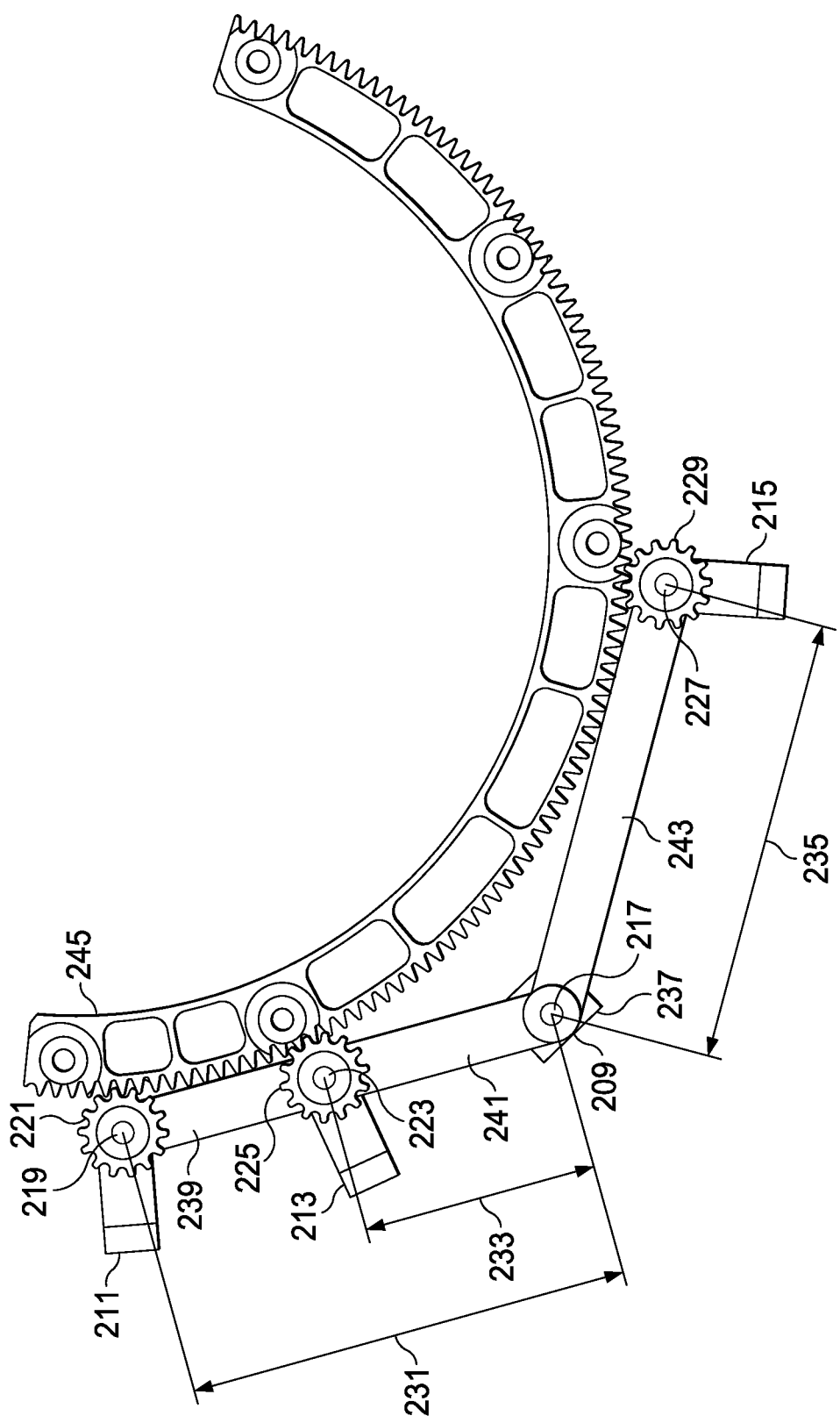
FIG. 8 is a side view of an alternative embodiment of a resolver assembly according to this disclosure that may be implemented with the aircraft depicted in FIG. 1.

FIG. 8 is a side view of an alternative embodiment of a resolver assembly 209 that may be implemented with aircraft 101, for example in lieu of resolver assembly 131, to detect and measure rotation of spindle 113 about spindle axis 129. Resolver assembly 209 comprises a first resolver 211, a second resolver 213, and a third resolver 215 that are configured to redundantly detect and measure rotation of spindle 113 about spindle axis 129. Preferably, first resolver 211, second resolver 213, and third resolver 215 are gear-driven rotary variable differential transformer (RVDT) sensors. It should be appreciated that resolver assembly 209 is not limited to being implemented with RVDT sensors for first, second, and third resolvers 211, 213, and 215, and that resolver assembly 209 may alternatively be implemented with one or more other types of resolvers.

Resolver assembly 209 is configured such that first resolver 211, second resolver 213, and third resolver 215 are independently pivotable about a shared pivot axis 217. Pivot axis 217 extends parallel to spindle axis 129. This configuration enables resolver assembly 209 to maintain engagement of first resolver 211, second resolver 213, and third resolver 215 with spindle 113. Resolver assembly 209 is configured to be mounted to a structural member of fuselage 103 of aircraft 101.

First resolver 211 comprises an input shaft 219 having a gear 221 that is coupled thereto, second resolver 213 comprises an input shaft 223 having a gear 225 that is coupled thereto, and third resolver 215 comprises an input shaft 227 having a gear 229 that is coupled thereto. Input shaft 219 of first resolver 211 is spaced from pivot axis 217 through a first distance 231 along a first radial direction that extends perpendicularly outward from a center of pivot axis 217 toward a central axis of input shaft 219. Input shaft 223 of second resolver 213 is spaced from pivot axis 217 through a second distance 233 along a second radial direction that extends perpendicularly outward from pivot axis 217 toward a central axis of input shaft 223. Input shaft 227 of third resolver 215 is spaced from pivot axis 217 through a third distance 235 along a third radial direction that extends perpendicularly outward from pivot axis 217 toward a central axis of input shaft 227. First distance 231 is equal to third distance 235, such that input shaft 219 of first resolver 211 and input shaft 227 of third resolver 215 are spaced equally from pivot axis 217 relative to each other. Second distance 233 is shorter than first distance 231 and third distance 235. Furthermore, the first radial direction, second radial direction, and third radial direction are not coincident with each other. Stated differently, the first, second, and third radial directions are angularly offset about pivot axis 217 relative to each other.

Resolver assembly 209 further comprises a base 155, a first carrier 239 to which first resolver 211 is fixedly mounted, a second carrier 241 to which second resolver 213 is fixedly mounted, and a third carrier 243 to which third resolver 215 is fixedly mounted. First carrier 239, second carrier 241, and third carrier 243 are coupled to base 237 such that first carrier 239, second carrier 241, and third carrier 243 are independently pivotable relative to each other about pivot axis 217. It should be appreciated that base 237, first carrier 239, second carrier 241, and third carrier 243 are not limited to the respective illustrated configurations. Base 237 is configured to be mounted to a structural member of fuselage 103 of aircraft 101.

Resolver assembly 209 is configured to engage with an engagement component 245. Engagement component 245 may be configured similarly to engagement component 177, for example similarly or identically to rib 181. Engagement component 245 engages with first resolver 211, second resolver 213, and third resolver 215, and in particular gears 221, 225, and 229 thereof, during rotation of spindle 113, thereby enabling first resolver 211, second resolver 213, and third resolver 215 to detect and measure rotation of spindle 113 about spindle axis 129. Resolver assembly 209 is configured such that first resolver 211, second resolver 213, and third resolver 215 are biased, for example using springs (not shown) toward spindle 113, and in particular against engagement component 245. Biasing first resolver 211, second resolver 213, and third resolver 215 toward spindle 113 isolates vibration and maintains engagement of first, second, and third resolvers 211, 213, 215 with engagement component 245. Resolver assembly 209 may be implemented with backstops (not shown), such as adjustable backstops, that limit how far one or more of first carrier 239, second carrier 241, and third carrier 243 can pivot about pivot axis 217.

FIG. 9 is a front view of another alternative embodiment of a resolver assembly 247 that may be implemented with aircraft 101, for example in lieu of resolver assembly 131, to detect and measure rotation of spindle 113 about spindle axis 129. Resolver assembly 247 comprises a first resolver 249 and a second resolver 251 that are configured to redundantly detect and measure rotation of spindle 113 about spindle axis 129. Preferably, first resolver 249 and second resolver 251 are gear-driven rotary variable differential transformer (RVDT) sensors. It should be appreciated that resolver assembly 247 is not limited to being implemented with RVDT sensors for first resolver 249 and second resolver 251, and that resolver assembly 247 may alternatively be implemented with one or more other types of resolvers.

Resolver assembly 247 is configured such that first resolver 249 and second resolver 251 are independently pivotable about a shared pivot axis 253. Pivot axis 253 extends parallel to spindle axis 129. This configuration enables resolver assembly 247 to maintain engagement of first resolver 249 and second resolver 251 with spindle 113. Resolver assembly 247 is configured to be mounted to a structural member of fuselage 103 of aircraft 101.

First resolver 249 comprises an input shaft 255 having a gear 257 that is coupled thereto and second resolver 251 comprises an input shaft 259 having a gear 261 that is coupled thereto. Input shaft 255 of first resolver 249 is spaced from pivot axis 253 through a first distance 263 along a first radial direction that extends perpendicularly outward from a center of pivot axis 253 toward a central axis of input shaft 255. Input shaft 259 of second resolver 251 is spaced from pivot axis 253 through a second distance 265 along a second radial direction that extends perpendicularly outward from pivot axis 253 toward a central axis of input shaft 259. First distance 263 is equal to second distance 265, such that input shaft 255 of first resolver 249 and input shaft 259 of second resolver 251 are spaced equally from pivot axis 253 relative to each other. Furthermore, the first radial direction and second radial direction are coincident with each other.

Resolver assembly 247 further comprises a base 267, a first carrier 269 to which first resolver 249 is fixedly mounted, and a second carrier 271 to which second resolver 251 is fixedly mounted. First carrier 269 and second carrier 271 are coupled to base 267 such that first carrier 269 and second carrier 271 are independently pivotable relative to each other about pivot axis 253. It should be appreciated that base 267, first carrier 269, and second carrier 271 are not limited to the respective illustrated configurations. Base 267 is configured to be mounted to a structural member of fuselage 103 of aircraft 101.

Resolver assembly 247 is configured to engage with an engagement component 273. Engagement component 273 may be configured similarly to engagement component 177, for example similarly to rib 181. Engagement component 273 engages with first resolver 249 and second resolver 251, and in particular gears 257 and 261 thereof, during rotation of spindle 113, thereby enabling first resolver 249 and second resolver 251 to detect and measure rotation of spindle 113 about spindle axis 129. Resolver assembly 247 is configured such that first resolver 249 and second resolver 251 are biased, for example using springs (not shown) toward spindle 113, and in particular against engagement component 273. Biasing first resolver 249 and second resolver 251 toward spindle 113 isolates vibration and maintains engagement of first and second resolvers 249, 251 with engagement component 273. Resolver assembly 247 may be implemented with backstops (not shown), such as adjustable backstops, that limit how far one or more of first carrier 269 and second carrier 271 can pivot about pivot axis 253.

FIG. 10 is a front view of still another alternative embodiment of a resolver assembly 275 that may be implemented with aircraft 101, for example in lieu of resolver assembly 131, to detect and measure rotation of spindle 113 about spindle axis 129. Resolver assembly 275 comprises a first resolver 277 and a second resolver 279 that are configured to redundantly detect and measure rotation of spindle 113 about spindle axis 129. Preferably, first resolver 277 and second resolver 279 are gear-driven rotary variable differential transformer (RVDT) sensors. It should be appreciated that resolver assembly 275 is not limited to being implemented with RVDT sensors for first resolver 277 and second resolver 279, and that resolver assembly 275 may alternatively be implemented with one or more other types of resolvers.

Resolver assembly 275 is configured such that first resolver 277 and second resolver 279 are independently pivotable about a shared pivot axis 281. Pivot axis 281 extends parallel to spindle axis 129. This configuration enables resolver assembly 275 to maintain engagement of first resolver 277 and second resolver 279 with spindle 113.

Resolver assembly 275 is configured to be mounted to a structural member of fuselage 103 of aircraft 101.

First resolver 277 comprises an input shaft 283 having a gear 285 that is coupled thereto and second resolver 279 comprises an input shaft 289 having a gear 291 that is coupled thereto. Input shaft 283 of first resolver 277 is spaced from pivot axis 281 through a first distance 293 along a first radial direction that extends perpendicularly outward from a center of pivot axis 281 toward a central axis of input shaft 283. Input shaft 289 of second resolver 279 is spaced from pivot axis 281 through a second distance 295 along a second radial direction that extends perpendicularly outward from pivot axis 281 toward a central axis of input shaft 289. First distance 293 is equal to second distance 295, such that input shaft 283 of first resolver 277 and input shaft 289 of second resolver 279 are spaced equally from pivot axis 281 relative to each other. Furthermore, the first radial direction and second radial direction are coincident with each other.

Resolver assembly 275 further comprises a base 297, a first carrier 299 to which first resolver 277 is fixedly mounted, and a second carrier 301 to which second resolver 279 is fixedly mounted. First carrier 299 and second carrier 301 are coupled to base 297 such that first carrier 299 and second carrier 301 are independently pivotable relative to each other about pivot axis 281. It should be appreciated that base 297, first carrier 299, and second carrier 301 are not limited to the respective illustrated configurations. Base 297 is configured to be mounted to a structural member of fuselage 103 of aircraft 101.

Resolver assembly 275 is configured to engage with a first engagement component 303 and a second engagement component 305. More specifically, resolver assembly 275 is configured such that first resolver 277 engages with first engagement component 303 and second resolver 279 engages with second engagement component 305. One or both of first and second engagement components 303, 305 may be configured similarly to engagement component 177, for example similarly to rib 181. Engagement components 303 and 305 engage with first resolver 277 and second resolver 279, respectively, and in particular gears 285 and 291 thereof, during rotation of spindle 113, thereby enabling first resolver 277 and second resolver 279 to detect and measure rotation of spindle 113 about spindle axis 129. Resolver assembly 275 is configured such that first resolver 277 and second resolver 279 are biased, for example using springs (not shown) toward spindle 113, and in particular against engagement components 303 and 305, respectively. Biasing first resolver 277 and second resolver 279 toward spindle 113 isolates vibration and maintains engagement of first resolver 277 with engagement component 303 and engagement of second resolver 279 with engagement component 305. Resolver assembly 275 may be implemented with backstops (not shown), such as adjustable backstops, that limit how far one or more of first carrier 299 and second carrier 301 can pivot about pivot axis 281.

It should be appreciated that while resolver assemblies, such as resolver assemblies 131, 209, 247, and 275 are illustrated and described herein as implemented for measuring angular displacement of ducts 107 (e.g., by measuring rotation of spindle 113) that a resolver assembly may alternatively be implemented to measure rotation of other shafts in an aircraft.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A ducted-rotor aircraft comprising:
a fuselage;
a spindle that is coupled to the fuselage such that the spindle is rotatable about a spindle axis; and
a resolver assembly that is configured to measure rotation of the spindle about the spindle axis, the resolver assembly comprising first and second resolvers that are independently pivotable about a shared pivot axis to maintain engagement of the first and second resolvers with the spindle.

2. The ducted-rotor aircraft of claim 1, wherein the first and second resolvers comprise respective first and second input shafts, the first input shaft is spaced from the pivot axis through a first distance along a first radial direction that extends perpendicularly outward from the pivot axis, and the second input shaft is spaced from the pivot axis through a second distance along a second radial direction that extends perpendicularly outward from the pivot axis.

3. The ducted-rotor aircraft of claim 2, wherein the first distance is equal to the second distance.

4. The ducted-rotor aircraft of claim 2, wherein the first radial direction is not coincident with the second radial direction.

5. The ducted-rotor aircraft of claim 1, further comprising an engagement component that is carried by the spindle and that engages with the first and second resolvers.

6. The ducted-rotor aircraft of claim 5, wherein the engagement component comprises a body having an arc-shaped outer surface that defines a plurality of gear teeth, and wherein the first and second resolvers further comprise respective first and second gears that are coupled to the first and second input shafts, the first and second gears having complementary teeth configured to engage the plurality of gear teeth of the engagement component.

7. The ducted-rotor aircraft of claim 1, the resolver assembly further comprising:
a base that is mounted to the fuselage;
a first carrier to which the first resolver is fixedly mounted; and
a second carrier to which the second resolver is fixedly mounted,
wherein the first and second carriers are coupled to the base such that the first and second carriers pivot along with the first and second resolvers about the pivot axis.

8. The ducted-rotor aircraft of claim 1, wherein the first and second resolvers are biased toward the spindle.

9. A resolver system for a ducted-rotor aircraft:
an engagement component that is configured to be carried by a rotatable spindle of the ducted-rotor aircraft; and
a resolver assembly that is configured to measure rotation of the spindle about a spindle axis, the resolver assembly comprising first and second resolvers that are each independently pivotable about a shared pivot axis to maintain engagement of the first and second resolvers with the engagement component.

10. The resolver system of claim 9, wherein the first and second resolvers comprise respective first and second input shafts, the first input shaft is spaced from the pivot axis through a first distance along a first radial direction that extends perpendicularly outward from the pivot axis, and the second input shaft is spaced from the pivot axis through a second distance along a second radial direction that extends perpendicularly outward from the pivot axis.

11. The resolver system of claim 10, wherein the first distance is equal to the second distance.

12. The resolver system of claim 10, wherein the first radial direction is not coincident with the second radial direction.

13. The resolver system of claim 9, wherein the engagement component comprises a body having an arc-shaped outer surface that defines a plurality of gear teeth, and
wherein the first and second resolvers further comprise respective first and second gears that are coupled to the first and second input shafts, the first and second gears having complementary teeth configured to engage the plurality of gear teeth of the engagement component.

14. The resolver system of claim 9, the resolver assembly further comprising:
a base that is mountable to a structural component of the ducted-rotor aircraft;
a first carrier to which the first resolver is fixedly mounted; and
a second carrier to which the second resolver is fixedly mounted,
wherein the first and second carriers are coupled to the base such that the first and second carriers pivot along with the first and second resolvers about the pivot axis.

15. The resolver system of claim 14, wherein the resolver assembly is configured such that the first and second resolvers are biased toward the spindle.

16. A resolver assembly that is configured to measure rotation of a spindle of a ducted-rotor aircraft, the resolver assembly comprising:
a first resolver having a first input shaft and a first gear coupled to the first input shaft; and
a second resolver having a second input shaft and a second gear coupled to the second input shaft,
wherein the first and second resolvers are coupled about a shared pivot axis and are independently pivotable about the pivot axis to maintain engagement of the first and second resolvers with the spindle, such that rotation of the spindle causes rotation of the first and second gears, and
wherein the first input shaft is spaced from the pivot axis through a first distance along a first radial direction that extends perpendicularly outward from the pivot axis and the second input shaft is spaced from the pivot axis through a second distance along a second radial direction that extends perpendicularly outward from the pivot axis.

17. The resolver assembly of claim 16, the resolver assembly further comprising:
a base that is mountable to a structural component of the ducted-rotor aircraft;
a first carrier to which the first resolver is fixedly mounted; and
a second carrier to which the second resolver is fixedly mounted,
wherein the first and second carriers are coupled to the base such that the first and second carriers pivot along with the first and second resolvers about the pivot axis.

18. The resolver assembly of claim 16, wherein the first distance is equal to the second distance.

19. The resolver assembly of claim 16, wherein the second radial direction is not coincident with the first radial direction.

20. The resolver assembly of claim 16, wherein the resolver assembly is configured such that the first and second resolvers are biased toward the spindle.

* * * * *